United States Patent [19]

Markusch et al.

[11] 4,129,696

[45] Dec. 12, 1978

[54] PROCESS FOR THE PRODUCTION OF INORGANIC-ORGANIC PLASTIC COMPOSITES

[75] Inventors: Peter Markusch, Cologne; Dieter Dieterich; Manfred Dietrich, both of Leverkusen, all of Germany

[73] Assignee: Bayer Aktiengesellschaft, Leverkusen, Fed. Rep. of Germany

[21] Appl. No.: 664,126

[22] Filed: Mar. 5, 1976

[30] Foreign Application Priority Data

Mar. 20, 1975 [DE] Fed. Rep. of Germany ....... 2512170

[51] Int. Cl.² .............................................. C08G 18/14
[52] U.S. Cl. .................................. 521/154; 521/122; 521/160; 521/161; 521/162
[58] Field of Search ..................... 260/2.5 AK, 2.5 AT

[56] References Cited

U.S. PATENT DOCUMENTS

| | | | |
|---|---|---|---|
| 3,607,794 | 9/1971 | Abbotson | 260/2.5 AK |
| 3,634,342 | 1/1972 | Boblitt | 260/2.5 AK |
| 3,965,051 | 6/1976 | Markusch | 260/2.5 AK |
| 3,975,316 | 8/1976 | Villa | 260/2.5 AK |
| 3,981,831 | 9/1976 | Markusch | 260/2.5 AK |
| 3,983,081 | 9/1976 | Dieterich | 260/2.5 AK |
| 4,042,536 | 8/1977 | Dieterich | 260/2.5 AK |
| 4,052,347 | 10/1977 | Dieterich | 260/2.5 AK |
| 4,057,519 | 11/1977 | Summers | 260/2.5 BE |
| 4,072,637 | 2/1978 | Blount | 260/2.5 AK |

FOREIGN PATENT DOCUMENTS

| | | | |
|---|---|---|---|
| 1362003 | 4/1964 | France | 260/2.5 AK |
| 1419552 | 10/1965 | France | 260/2.5 AK |
| 1137465 | 12/1968 | United Kingdom | 260/2.5 AK |

OTHER PUBLICATIONS

"Poly b-d Liquid Resins", Product Data Bulletin Number 505; Sinclair Petrochemicals, Inc., issued May 1, 1965.

*Primary Examiner*—C. Warren Ivy
*Attorney, Agent, or Firm*—Gene Harsh; Joseph C. Gil

[57] ABSTRACT

The instant invention is directed to a novel process for the production of inorganic/organic plastic materials and the resultant products. The process generally comprises reacting an aqueous alkali metal silicate solution with a liquid organic polyisocyanate having a viscosity at 25° C of at least about 400 cP. Preferably, the process is utilized to produce high quality, lightweight foams having excellent physical properties.

19 Claims, No Drawings

PROCESS FOR THE PRODUCTION OF INORGANIC-ORGANIC PLASTIC COMPOSITES

BACKGROUND OF THE INVENTION

It is known that polyurethane and polyurea plastics can be obtained from polyisocyanates and compounds containing active hydrogen atoms. The properties of these plastics vary within a wide range. High strength, elasticity and wear resistance are particularly valuable properties of these products. On the other hand, their thermal stability and, in particular, their permanent dimensional stability at temperatures above 120° C. is only moderate. The use of these products as building and structural components is limited by their inflammability. Although their inflammability can be reduced by the addition of flameproofing agents, their mechanical properties are generally adversely affected.

It is also known that inorganic silica gel plastics can be obtained from aqueous solutions of alkali silicates by the action of (potential) acids. Silica gel plastics have acquired particular usefulness as cements and surface coatings. Lightweight foams have also been produced from waterglass. Products of this kind have a high dimensional stability under heat and are completely noninflammable. However, they are brittle and have fairly low strength. In the form of foams, they are substantially incapable of withstanding loads and disintegrate under the effect of pressure. It would be extremely desirable to combine the favorable properties of inorganic and organic plastics materials with one another and to eliminate the unfavorable properties of both. Accordingly, there has been no shortage of attempts to produce composite plastics, although to data, no completely satisfactory product has been found.

Polyurethanes have been mixed with active silica as filler and the resulting mixtures subsequently vulcanized. A certain reinforcing effect is obtained in this way, as in cases where highly active carbon black is used. Tensile strength and modulus increase, while elongation at break decreases. The presence of silica does not generally alter the properties of the material. The systems in question are relatively coarse, heterogeneous two-phase systems. The interaction between the two phases is only minimal because of the relatively small interface and the completely different chemical nature of the two phases.

It has also been proposed to use silica in the form of microfibers. In this case, the reinforcing effect is increased by virtue of the specific morphology. On the other hand, the incoherent zones inevitably become larger, so that the chemical interaction between the two phases actually decreases and, thus, the general character of the coarse heterogeneous two-phase plastics material remains intact.

According to U.S. Patent No. 3,607,794, an aqueous solution of an alkali silicate is reacted with a low molecular weight polyisocyanate such as 4,4'-diphenyl methane diisocyanate. The following specific disclosure is made in regard to the isocyanates used:

"Suitable polyisocyanates which be employed in the process of the invention are exemplified by the organic diisocyanates which are compounds of the general formula:

O=C=N—R—N=C=O where R is a divalent organic radical such as an alkylene, aralkylene or arylene radical. Suitable such radicals may contain, for example, 2 to 20 carbon atoms.

Examples of such diisocyanates are:
p,p'-diphenylmethane diisocyanate (sic)
phenylene diisocyanate
chlorophenylene diisocyanate
tolylene diisocyanate
m-xylylene diisocyanate
benzidene diisocyanate
naphthylene diisocyanate
tetramethylene diisocyanate
pentamethylene diisocyanate
hexamethylene diisocyanate
decamethylene diisocyanate
thiodipropyl diisocyanate Other polyisocyanates, polyisothiocyanates and their derivatives may be equally employed. Fatty diisocyanates are also suitable of the general formula

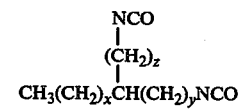

where x + y totals 6 to 22 and z is 0 to 2, e.g. isocyanatostearyl isocyanate. Of the foregoing, p,p'-diphenylmethane diisocyanate has been found in practice to be most suitable. Tolylene diisocyanates, e.g. the 2,4- and 2,6-isomers, are also readily available and suitable for use."

According to the teaching of this patent, commercially available sodium silicate solutions are used as the aqueous alkali silicate solutions. The following disclosure is made in regard to the quantitative ratio of isocyanate to alkali silicate:

"The relative proportions of the alkali metal silicate and the isocyanate may be varied yielding, as noted above, products of different physical characteristics and probably differing chemical structure.

In general it is desirable to employ an excess of the silicate, i.e., a quantity greater than would be stoichiometrically equivalent to the isocyanate employed. On the other hand it is important not to use so little isocyanate that insufficient reaction occurs. Typically, using p,p'-diphenylmethane diisocyanate (which is commercially available at a strength of about 85–90 percent, calculated on a molecular weight of 250), and a sodium silicate of $Na_2O:SiO_2$ ratio is 2.0:1.0 to 2.3:1.0, the weight ratio of silicate to isocyanate may vary from 1:7.75 to 3:1."

The above-mentioned, low-viscosity, substantially bifunctional polyisocyanates are the same as those which are generally used in the polyurethane foam art and with which favorable results are generally obtained in foams. Although readily obtainable, the polyisocyanates described above are only of limited suitability for the production of a composite plastics material based on polyisocyanate and aqueous silicate solutions.

By following the teaching of U.S. Pat. No. 3,607,794, it can be seen that mixtures of aqueous sodium silicate solution and the low-viscosity diphenyl methane diisocyanate only form relatively coarsely divided emulsions. This disadvantage can be offset to some degree by the recommended addition of emulsifiers and foam stabilizers, which make the primary emulsions somewhat more finely divided and more stable, but unfortunately the property spectrum remains unsatisfactory. In particular, the composite plastics obtained are extremely brittle and are very limited in strength. The foams produced in accordance with the known teaching show considerable faults, such as cracks and/or voids, in their foam structure. In some cases, the foam mixture collapses, especially when relatively large quantities are to be foamed. The foam plastics produced from the starting materials described are those only of limited suitability for large-scale manufacture.

According to U.S. application Ser. No. 364,763, filed on 5/29/73 now abandoned, the problems referred to above are solved by using polyisocyanates containing ionic groups which provide for better emulsifiability between organic and inorganic phase, so that inorganic-organic plastics having a better level of properties are obtained by virtue of the more finely divided emulsions.

A similar effect is obtained by modifying the polyisocyanates used with non-ionic hydrophilic groups (see, e.g. U.S. application Ser. No. 469,253, filed 5/13/74.

Unfortunately, the last two processes are attended by the following disadvantages:
(1) the need to subject standard commercial-grade polyisocyanates to another, and in some cases, expensive, chemical reaction;
(2) the increased reactivity and increased sensitivity to atmospheric moisture which hydrophilizing generally involves.

U.S. application Ser. No. 446,577, filed 2/27/74, now U.S. Pat. No. 3,983,081, describes a foam concrete based on waterglass, polyisocyanate and inorganic water-binding fillers. The process described in this application generally results in the formation of foam plastics having relatively high gross densities (>100 kg/m$^3$). In addition, it is necessary, because of the solid filler used in accordance with the invention, to use metering and mixing units of the type normally not used for the production of foams from exclusively liquid components.

The object of the present invention is to obviate the disadvantages of conventional composite plastics referred to above and, in addition, to provide hard inorganic-organic plastics which have the advantage of high toughness and strength and, in the case of foamed materials, which can be produced with fewer difficulties and have a more regular cell structure. More particularly, the object of the invention is to enable high-quality inorganic-organic lightweight foams to be obtained safely and economically from readily available polyisocyanates in standard foaming machines without any need for water-binding fillers to be used.

DESCRIPTION OF THE INVENTION

The instant invention relates to a process for the production of hard inorganic-organic plastics, more especially foams, consisting of a polymer-polysilica gel composite material, in the form of a xerosol of the solid/solid type by reacting an aqueous alkali metal silicate solution with a polyisocyanate, distinguished by the fact that the polyisocyanate used is a liquid, organic polyisocyanate, free from hydrophilic groups, having a viscosity of at least about 400 cP at 25° C., preferably of from about 500 to about 10,000 cP at 25° C., and an average functionality of greater than 2, the reaction being carried out in the absence of water-binding inorganic fillers.

The invention also relates to hard inorganic-organic plastics having high strength, elasticity, dimensional stability under heat and a high degree of non-inflammability, consisting essentially of a macroscopic-homogeneous composite material of high molecular weight organic polyadduct and high molecular weight silicate, obtainable by the process of the instant invention.

Relative to the polyisocyanates usable herein, any polyisocyanate having a viscosity at least about 400 cP at 25° C. is suitable. For processing reasons, however, a viscosity range from about 500 to about 10,000 cP at 25° C. and more especially from about 800 to about 6000 cP at 25° C., is generally preferred. If the polyisocyanates used are of high viscosity, resin-like or even solid, the required viscosity may be adjusted by adding low-viscosity polyisocyanates and/or inert organic solvents. Highly viscous, resin-like or solid polyisocyanates of this kind are products suitable for use in accordance with the invention providing they have a viscosity at least 400 cP at 25° C. when formed into solutions (such as by adding low viscosity polyisocyanates and/or solvents) and providing the polyisocyanate component has a functionality of greater than 2.

Suitable liquid organic polyisocyanates free from hydrophilic groups which satisfy the above-mentioned requirements in regard to viscosity and functionality, are preferably those which are readily available, such as polyphenyl-polymethylene-polyisocyanates of the type obtained by condensing aniline with formaldehyde, followed by phosgenation. The requisite viscosity at least 400 cP at 25° C. may readily be adjusted, for example, by establishing a suitable aniline: formaldehyde ratio or, if the phosgenated product does not have the high viscosity required, by partly distilling off the binuclear products. Other phosgenation products of arylaminealdehyde condensates are of course also eminently suitable.

Examples of this class are, for example, the phosgenation products of condensates of aniline and aldehydes or ketones, such as acetaldehydes, propionaldehyde, butyraldehyde, acetone, methyl ethyl ketone and the like. Other suitable phosgenation products are the phosgenation products of condensates of anilines alkyl-substituted on the nucleus such as tolidines, with aldehydes or ketones, such as formaldehyde, acetaldehyde, butyraldehyde, acetone and methyl ethyl ketone. Polyisocyanates of this kind are particularly preferred for the process according to the invention. Their functionality is preferably between 2.2 and 3. Their binuclear product content preferably amounts to less than 50%.

Solutions of residual isocyanates in monomeric polyisocyanates are also suitable. Residual isocyanates include, in particular, the highly viscous, resin-like or solid distillation residues of the type accumulating, for example, in the commercial production of tolylene diisocyanate, diphenyl methane diisocyanate or hexamethylene diisocyanate.

Residual isocyanates of this kind, whose average functionality is always greater than 2 and preferably between 2.2 and 3, may be adjusted to the viscosity required for processing by admixture with, for example, low-viscosity standard commercial-grade diisocyanates. Mixtures of the residual isocyanates with one another, providing they are in the form of liquid products, are also suitable as are solutions of highly viscous or solid residues in inert organic solvents. In one preferred procedure, the inert organic solvents used have a boiling point in the range from −25° to +80° C. and are suitable for use as blowing agents in the production of foams in accordance with the invention.

Another group of suitable polyisocyanates are so-called modified polyisocyanates, i.e., polyisocyanates containing carbodiimide groups, allophanate groups, isocyanurate groups, urea groups amide groups, imide groups or biuret groups. Polyisocyanates suitable for modification in this way include aliphatic, cycloaliphatic, araliphatic, aromatic and heterocyclic polyisocyanates of the type described, for example, by W. Siefken in Justus Liebigs, Annalen der Chemie, 562, pages 75 to 136. Specific examples include, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanato methyl cyclohexane (German Auslegeschrift 1,202,785; U.S. Pat. No. 3,401,190); 2,4- and 2,6-hexahydro tolylene diisocyanate and mixtures of these isomers; hexahydro-1,3- and/or 1,4-phenyylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers; diphenyl methane-2,4'- and/or 4,4'-diisocyanate; naphthylene-1,5-diisocyanate; triphenyl methane-4,4',4"'-triisocyanate; polyphenyl-polymethylene-polyisocyanates of the type obtained by condensing aniline with formaldehyde, followed by phosgenation and described in British Pat. Nos. 874,430 and 848,671; and perchlorinated aryl polyisocyanates of the type described in U.S. Pat. No. 3,277,138.

Polyisocyanates of this type are modified in known manner either thermally and/or catalytically by air, water, urethanes, alcohols, amides, amines, carboxylic acids or carboxylic acid anhydrides.

Monofunctional low molecular weight alcohols (preferably having 1 to 12 carbon atoms, such as methanol, ethanol, n- and isopropanol, butanol, hexanol, n-octyl alcohol, dodecyl alcohol) may also be used as modifying agents, providing the urethane groups formed are converted into allophanate groups by further reaction with isocyanate present and providing the functionality of the resulting modified polyisocyanate is not reduced to an undesirable extent in this way.

Starting from low-viscosity polyisocyanates, this type of modification guarantees the viscosity of at least 400 cP at 25° C. required in accordance with the invention. However, when the aforementioned modifying agents are used, the degree of modification should never be so high that the resulting polyisocyanates have a hydrophilic character. Polyisocyanates without any hydrophilic properties are generally obtained when the low molecular weight modifying agent is used in the small quantities of less than 10% by weight, based on the polyisocyanate. It is particularly preferred to use adducts of the polyisocyanates with themselves, such as uretdiones, isocyanurates and carbodiimides, which are readily obtainable from monomeric polyisocyanates having an increase in molecular weight and which satisfy the minimum viscosity requirement of 400 cP at 25° C. In general, it is entirely sufficient to complete this adduct formation to a low percentage (for example, 5 to 30% based on the total quantity) in order to obtain the required viscosity range.

In the context of the invention, "polyisocyanates free from hydrophilic groups" are polyisocyanates which do not contain (1) an ionic center, (2) a group which can be converted into an ionic center by bases (for example a phenolic OH groups) (3) a hydrophilic oligo or polyether radical, or (4) a hydrophilic oligo or polycarbonate radical. Thus, a urethane, urea, biuret, allophanate, ester, ether or acetal group does not count as a hydrophilic group in the context of this definition.

Polyisocyanates suitable, although less preferred, for the process according to the invention are the semiprepolymers and prepolymers obtained by the so-called isocyanatepolyaddition process, providing they do not contain any hydrophilic groups and satisfy the requirements according to the invention in regard to viscosity and functionality.

Semi-prepolymers and prepolymers, which may be obtained by reacting polyisocyanates with compounds containing isocyanate-reactive hydrogen atoms, have been repeatedly described and are known in the art. Examples of compounds containing isocyanate-reactive hydrogen atoms include alcohols, glycols or even relatively high molecular weight polyols, mercaptans, carboxylic acids, amines, urea and amides. However, relatively high molecular weight polyhydroxy compounds with a low glass temperature should not be used in appreciable quantities in order not to impair the required hardness of the product.

Prepolymers of this kind should always contain terminal isocyanate groups, but should not have a hydrophilic center which increases compatibility with water in relation to comparable products without the hydrophilic center.

Suitable polyesters containing hydroxyl groups include reaction products of polyhydric (preferably dihydric and, in some cases, even trihydric alcohols) with polybasic (preferably dibasic) carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted (for example by halogen atoms) and/or unsaturated. Examples of polycarboxylic acids such as these are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid bis-glycol ester.

Particularly suitable prepolymers are reaction products of polyisocyanates with monohydric or polyhydric alcohols. In cases where monoalcohols, for example, methanol, ethanol, n-propanol and n-butanol are exclusively used, it is important to ensure either that polyisocyanates having a functionality of greater than 2 are used, and/or that prepolymerization is accompanied by allophanate formation, isocyanurate formation or by other reactions which increase functionality. In either case, the average functionality of the resulting prepolymer must be greater than 2.

Prepolymerization carried out in the usual way gives prepolymers which have a viscosity of frequently more than 2000 cP and occasionally up to 100,000 cP and higher at 25° C. In cases where viscosities as high as these are detrimental to further processing, the viscosity may be reduced by adding low-viscosity isocyanates or even by adding inert solvents.

Polyisocyanates particularly preferred for the purpose of the invention are the liquid distillation residues of the already mentioned polyphenyl-polymethylene-polyisocyanates having viscosities of from 400 to 10,000 cP at 25° C. and preferably from 500 to 6000 cP/25° C., and an average functionality of greater than 2.

In the context of the invention, aqueous solutions of alkali silicates are the solutions of sodium and/or potassium silicate in water normally known as "waterglass". It is also possible to use crude commercial-grade solutions which may additionally contain, for example, calcium silicate, magnesium silicate, borates and aluminates. The molar ratio of $Me_2O$ to $SiO_2$ (Me = metal) is not critical and may fluctuate within the usual limits. It preferably amounts to between 4 and 0.2 and more especially to between 1.5 and 0.3. If the water content of the plastics material is not harmful or can be readily eliminated by drying, it is readily possible to use neutral sodium silicate of which 25 to 35% by weight solutions may be prepared. However, it is preferred to use 32 to 54% by weight silicate solutions which, only with adequate alkalinity have a viscosity of less than 500 poises, which is generally required for problem-free processing. Ammonium silicate solutions, for example, solutions of guanidinium silicate, may also be used, although they are less preferred. The solutions in question may be true solutions or even colloidal solutions. The choice of concentration is governed above all by the end product required. Compact or closed-cell materials are preferably produced with concentrated silicate solutions, which if necessary, are adjusted to a low viscosity by the addition of alkali hydroxide. 40 to 70% by weight solutions may be prepared in this way. On the other hand, it is preferred to use silicate solutions having a concentration of 20 to 40% by weight for the production of open-cell lightweight foams, in order to obtain low viscosities, sufficiently long reaction times and low unit weights. Even when finely divided inorganic fillers are used in relatively large quantities, silicate solutions having a concentration of from 20 to 45% by weight are preferred.

The production of the inorganic-organic plastics in accordance with the invention is simple. All that is necessary is to homogeneously mix the liquid polyisocyanate with the aqueous alkali silicate solution, after which the mixture generally hardens immediately. The mixtures are typical finely divided emulsions or sols. They are not optically clear, but generally opaque or milky-white. The subsequent xerosol of the solid/solid type appears to be preformed in them.

The mixture of the components is not stable. The so-called "pot life", during which the mixtures are processible, is governed by the reactivity of the polyisocyanate, by the total quantity of silicate hardener liberated and by the concentration of the silicate solution. Such pot lives generally amount to between 0.2 seconds and about 15 hours. Pot lives of from about 1 second to about 20 minutes are preferred. It follows from this that mixing is generally carried out immediately before forming or shaping.

The new polymer-silica gel composite materials may be produced by known technologies, for example, by the same methods by which cast or foamed polyurethanes are produced. However, since the pot lives are generally relatively short and since the reaction often takes place spontaneously at temperatures as low as −20° C., limits are imposed upon the possibilities of batch production. In practice, batch production may only be used for relatively small moldings having a maximum weight of 5.0 kg. The components are preferably mixed continuously in a short-dwell mixing chamber by methods normally used for the production of polyurethane foams and subsequently hardened in molds. To this end, the liquid or pasty mixture is, for example, poured into molds, applied to surfaces or packed into recesses, joints, gaps and the like.

The mixing weight ratio between polyisocyanate and alkali silicates may vary within wide limits, for example, from 90:10 to 10:90. The ratio between polyisocyanate and alkali silicate preferably amounts to between 75:25 and 15:85. Optimum service properties, more especially high insulating capacity and high elasticity, dimensional stability under heat and substantial non-inflammability, are obtained with a mixing ratio of from 60:40 to 18:82. Accordingly, this range is particularly preferred.

It follows from the mixing ratios quoted above that the quantitative ratio of polyisocyanate and alkali silicate solution is not critical in the production of the polymersilica gel composite material. This is a particular advantage insofar as it eliminates the need for exact dosage in continuous production using delivery units and mixing chambers. Thus, it is possible to use heavy-duty delivery units, such as gear pumps or eccentric screw pumps.

The activity of the reaction mixture may be adjusted both through the isocyanate-silicate ratio and by using catalysts.

Products of low silicate content, for example, between 10 and 30% are preferably produced when the organic polymer properties are of paramount importance and the silicate content is required, for example, for the more effective binding of fillers, more especially of the so-called inactive types, such as chalk, heavy spar, gypsum, anhydrite, clay or kaolin.

In addition, the use of small quantities of silicate solutions is necessary when an isocyanate prepolymer is intended to be hardened with water to form a non-porous homogeneous plastics material. Since the reaction of NCO-groups with water is known to be accompanied by the evolution of $CO_2$, it can virtually only be used for the production of foams. Even when waterglass solutions are used in conventional elastomer recipes, it is not possible to avoid the formation of pores through the evolution of $CO_2$. By contrast, the reaction of polyisocyanates with concentrated alkali silicate solutions, which may optionally be alkalized, results in the formation of a product with considerably reduced pore formation and with co-ordinated quantitative ratios, which may readily be empirically determined in the formation of a "water-extended" or "water-crosslinked" completely bubble-free material. Accordingly, high-grade homogeneous polyureas are obtained by a simple solvent-free direct process.

High silicate contents, for example, in the range from 70 to 90% by weight, are desirable when it is essentially the properties of an inorganic silicate plastics material, more especially resistance to high temperatures and total noninflammability, which are required. In this case, the function of the polyisocyanate is also that of an involatile hardener whose reaction product is a high molecular weight polymer which reduces the brittleness of the product. By virtue of their elasticizing effect, polyisocyanate prepolymers in particular, are superior to conventional acid-based hardeners. The hardening times generally increase with decreasing NCO-group content. It is of course also possible to use polyisocyanates, more especially those with an inadequate hardening effect, in combination with acid-liberating hardeners. In this case, the reaction products of the polyisocyanates act as elasticizing component.

Mixtures of polyisocyanates and aqueous silicate solutions, which contain more than 50% of water, are preferably used for the production of thin layers, for example, surface coatings or cements, bonds, gap-filling compounds and in particular, for the production of foams.

In the production of foams by the process according to the invention, it is also advisable to use blowing agents. These blowing agents are inert liquids boiling at temperatures in the range from −25° C. to +80° C. The blowing agents preferably have boiling points in the range from −15° C. to +40° C. The blowing agents are preferably insoluble in the silicate solution. The blowing agents are used in quantities of from 0 to 50% by weight and preferably in quantities of from 2 to 30% by weight, based on the reaction mixture.

Suitable organic blowing agents include halogen-substituted alkanes such as methylene chloride; chloroform; ethylidene chloride; vinylidene chloride; monofluorotrichloromethane; chlorodifluoromethane; or dichlorodifluoromethane; butane; hexane; heptane; diethyl ether and the like. A blowing effect may also be obtained by adding compounds which decompose spontaneously at temperatures above room temperature, giving off gases such as nitrogen. Examples of such compounds are azo compounds such as azoisobutyronitrile. Further examples of blowing agents and information on the use of blowing agents can be found in Kunststoff-Handbuch, Vol. VII, published by Vieweg and Hochtlen Carl-Hanser-Verlag, Munich 1966, pages 108 and 109, 453 to 455 and 507 to 510.

According to the invention, catalysts are also frequently used. Examples of suitable catalysts are those known per se, including tertiary amines, such as triethylamine, tributylamine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethyl aminoethyl piperazine, N,N-dimethyl benzylamine, bis-(N,N-diethyl aminoethyl)adipate, N,N-diethyl benzylamine, pentamethyl diethylene triamine, N,N-dimethyl cyclohexylamine, N,N,N',N'-tetramethyl-1,3-butanediamine, N,N-dimethyl-$\beta$-phenyl ethylamine, 1,2-dimethyl imidazole and 2-methyl imidazole.

Examples of tertiary amines containing isocyanate-reactive hydrogen atoms are triethanolamine, triisopropanolamine, N-methyl diethanolamine, N-ethyl diethanolamine, N,N-dimethyl ethanolamine, and their reaction products with alkylene oxides, such as propylene oxide and/or ethylene oxide.

Other suitable catalysts are silaamines having carbon-silicon bonds of the type described in German Patent 1,299,290. Examples include, 2,2,4-trimethyl-2-silamorpholine or 1,3-diethyl aminomethyl tetramethyl disiloxane.

Suitable catalysts are also nitrogen-containing bases such as tetraalkyl ammonium hydroxides; alkali hydroxides such as sodium hydroxide; alkali phenolates such as sodium phenolate and alkali alcoholates such as sodium methylate. Hexahydrotriazines may also be used as catalysts.

According to the invention organo metallic compounds, especially organo tin compounds, may also be used as catalysts. Preferred organo tin compounds are tin(II) salts of carboxylic acids such as tin(II) acetate, tin (II) octoate, tin (II) ethyl hexoate and tin (II) laurate, and the dialkyl tin salts of carboxylic acids such as, for example, dibutyl tin diacetate, dibutyl tin dilaurate, dibutyl tin maleate or dioctyl tin diacetate.

Further examples of catalysts suitable for use in accordance with the invention and information on the way in which the catalysts work may be found in Kunststoff-Handbuch, Vol. VII, published by Vieweg and Hochtlen, Carl-Hanser-Verlag, Munich, 166, pages 96 to 102.

The catalysts are generally used in a quantity of from 0.001 to 10% by weight, based on the quantity of alkali metal silicate solution.

According to the invention, surface-active additives (emulsifiers and foam stabilizers) may also be used. Examples of emulsifiers are the sodium salts of castor oil sulphonates, fatty acids or salts of fatty acids with amines, such as diethylamine oleate or diethanolamine stearate.

Suitable foam stabilizers, include water-soluble polyether siloxanes. These compounds are generally of such structure that a copolymer of ethylene oxide and propylene oxide is attached to a polydimethyl siloxane radical. Foam stabilizers of this kind are described in U.S. Patent 2,764,565.

According to the invention, it is also possible to use reaction retarders, for example substances with an acid reaction, such as hydrochloric acid or organic acid halides; cell regulators known per se such as paraffins or dimethyl polysiloxanes; pigments or dyes; flameproofing agents known per se, for example tris-chloroethyl phosphate or ammonium phosphate and polyphosphate; stabilizers against the effects of ageing and weathering; plasticizers; substances having fungistatic and bacteriostatic effects and fillers such as barium sulphate, kieselguhr, carbon black or prepared chalk.

Further examples of the surface-active additives, foam stabilizers, cell regulators, reaction retarders, stabilizers, flameproofing agents, plasticizers, dyes, fillers, substances having fungistatic and bacteriostatic effects, and also information on the way in which these additives are used and how they work may be found in Kunststoff-Handbuch, Vol. VII, published by Vieweg and Hochtlen, Carl-Hanser-Verlag, Munich 1966 pages 103 to 113.

Of particular importance and, hence, preferred are additives which further reduce the inflammability of plastics of the type in question. In addition to the usual flameproofing agents, halogenating paraffins and inorganic salts of phosphoric acid, pyrophosphoric acid, metaphosphoric acid or polyphosphoric acid are particularly suitable for this purpose.

Small amounts (e.g. 0.5–10% based on polyisocyanate) of polyols, such as polyether- or polyesterpolyols may be added to improve emulsifying properties. However, it is preferred not to use such additives.

Generally, the foams are produced in accordance with the invention by mixing the described reaction components with one another in one or several stages using a batch-type or continuous mixer and foaming and allowing the mixture formed to harden, generally outside the mixer, in molds or on suitable substrates. The reaction temperature required, which amounts to between about 0° C. to 200° C. and preferably to between 30° C. and 160° C., may be reached either by preheating one or more reaction components before the actual mixing process, by heating the mixer itself or by heating the reaction mixture prepared after mixing. Combinations of these or other procedures may of course also be used for adjusting the reaction temperature. In most cases, sufficient heat is generated during the reaction itself, so that the reaction temperature can rise to levels above 30° C. after the beginning of the reaction or after the beginning of foaming.

However, the reaction components may also be reacted by the one-stage process, by the prepolymer process or by the semi-prepolymer process known per se, in many cases using machines, for example, those of the type described in U.S. Pat. No. 2,764,565. Information on processing machines of this type which may also be used in accordance with the invention, may be found in Kunststoff-Handbuch, Vol. VII, published by Vieweg and Hochtlen, Carl-Hanser-Verlag, Munich 1966, pages 121 to 205.

Particularly high-quality plastics are obtained by the process according to the invention when hardening is carried out at temperatures above 20° C. and more especially in the range from 30° to 100° C. So much heat is liberated, even in the absence of heat supplied from outside, especially in cases where combinations of polyisocyanates having 10 to 40% of NCO groups and alkali silicate solutions are used, that any water present begins to evaporate. Temperatures of more than 100° C. can be reached inside foam blocks.

It would seem that particularly pronounced interactions and a particularly intimate bond between inorganic and organic polymer are developed under conditions such as these, resulting in the formation of materials which, on the one hand, are hard, but on the other hand, are highly elastic and hence, unaffected by impact to a very considerable extent and are highly resistant to breakage.

If the heat given off during the reaction between the components is not sufficient, mixing may readily be carried out at elevated temperature, for example, at temperatures in the range from 40° to 100° C. In special cases, mixing may even be carried out under pressure at temperatures above 100° C. and up to about 150° C., so that when the material is discharged it is relieved of pressure and thereafter foams.

Relatively high boiling blowing agents, for example, hexane, dichloroethane, trichloroethane, carbon tetrachloride, light petrol, may of course also be used as additives in cases where foam production is carried out at elevated temperature. However, the water present in the mixture may also perform the function of blowing agent. Other suitable blowing agents are fine metal powders, for example, calcium, magnesium, aluminum or zinc which give off hydrogen with sufficiently alkaline waterglass. Blowing agents of this kind simultaneously have a hardening and reinforcing effect.

However, the foams may also be produced using inert gases, more especially air. For example, one of the two reaction components may be prefoamed with air and subsequently mixed with the others. The mixture of the components may also be prepared, for example, by means of compressed air, resulting directly in the formation of a foam which subsequently hardens during shaping or forming.

For given recipes, the properties of the foams formed, for example, their density when moist, are governed to a certain extent by the parameters of the mixing process, for example, the shape and rotational speed of the stirrer, the shape of the mixing chamber and the like and by the temperature selected for initiating the foaming reaction. The density may vary between approximately 0.005 and 0.6 g/cc, although the moist, fresh foam is generally obtained with densities of from 0.02 to 0.4 g/cc. The dried foams may be closed-cell or open-cell foams. In general, they are substantially open-cell foams and have densities of from 0.01 to 0.2 g/cc.

The behavior of the reaction mixtures provides the process according to the invention with numerous potential applications and, hence, fields of application of which a few are outlined by way of example in the following. The possibility of either leaving the water present in the hardened mixtures as a desirable constituent of the foam or of protecting the foam against the escape of water by suitable coating or lining, or of completely or partly eliminating the water by suitable drying techniques, for example heating cabinet, hot air, IR-heating, ultrasonics or high-frequency heating, may be selected according to the particular application envisaged.

The reaction mixture containing blowing agents may be, for example, coated onto warm, cold or even IR- or HF-irradiated substrates or, after passing the mixer, may by sprayed with compressed air or even by the airless process onto those substrates where it can foam and harden to form a filling or insulating or damp-proofing coating. The foaming reaction mixture may even be molded, cast or injection-molded into cold or heated molds and left to harden in those molds (relief or solid or hollow molds), optionally by centrifugal casting either at room temperature or at temperatures of up to 200° C., optionally under pressure. In this case, it is possible to use reinforcing elements in the form of inorganic and/or organic or metallic wires, fibers, nonwovens, foams, woven fabrics, skeletons and the like. This may be done, for example, by the fiber mat impregnating process or by processes in which reaction mixtures and reinforcing fibers are simultaneously applied to the mold, for example by means of a spray. The moldings obtainable in this way may be used as structural components, for example, in the form of foamed sandwich molding produced directly or subsequently by lamination with metal, glass, plastics and the like, their low inflammability in wet or dry form being an advantage in this respect. However, they may also be used as hollow bodies, for example, as containers for goods to be kept moist or cool, as filter materials or exchangers, as catalyst or active-material supports, as decorative elements, parts of furniture and cavity fillings. They may also be used as heavy-duty lubricants and coolants or as supports therefor, for example in the extrusion of metals. They may also be used in the field of model building and mold construction and in the manufacture of molds for casting metals.

In one preferred procedure, foaming is carried out at the same time as hardening, for example, by preparing the reaction mixture in a mixing chamber and simultaneously adding the readily volatile blowing agent, for example, dichlorodifluoromethane, trichlorofluoromethane, butane, isobutylene or vinyl chloride, so that (providing the temperature of the mixture is suitably selected) the reaction mixture issuing from the mixing chamber simultaneously foams through evaporation of the blowing agent and hardens under the effect of the hardener. In addition, the initially thinly liquid reaction mixture may be blown into a foam by introducing gases, optionally under pressure (such as air, methane, $CF_4$, noble gases) the foam thus formed being brought into the required form and hardened. Similarly, it is also possible initially to convert the silicate or polyisocyanate solution, optionally containing foam stabilizers such as wetting agents, foam formers, emulsifiers and other organic or inorganic fillers or diluents, into a foam by gassing and to mix this foam with the other component and, optionally, with the hardener in a mixer, followed by hardening.

In one preferred procedure, a solution of the polyisocyanate in a liquid blowing agent is mixed with the aqueous alkali silicate solution and the resulting mixture hardened while foaming.

Instead of using blowing agents, it is also possible to use inorganic or organic finely divided hollow bodies, such as expanded-glass hollow beads of plastics, straw and the like, for the production of foams.

The foams obtainable in this way may be used in dry or wet form, optionally after a compacting or tempering process, optionally carried out under pressure, as insulating materials, cavity fillings, packaging materials, building materials having a high resistance to solvents and a high degree of noninflammability. They may also be used as lightweight building elements in the form of sandwiches, for example with metal covering layers in house construction, vehicle construction and aircraft construction.

The lightweight inorganic-organic foams obtainable by the process according to the invention having a gross density of from 10 to 80 kg/m$^3$ are of particular interest.

Preferred starting components are filler-free alkali silicate solutions and polyisocyanates, the inorganicaqueous component being used in an excess (by weight) in order to obtain a high level of non-inflammability while blowing agents, for example air, halogenated hydrocarbons or gasliberating substances, for example $H_2O_2$, are generally used in order to reach the low gross densities required.

In the presence of catalysts and stabilizers, it is thus possible to produce inorganic-organic foams, which are of particular interest as lightweight insulating materials because of their high degree of non-inflammability and their favorable heat-insulating properties, using foaming machines of the kind commonly used in polyurethane technology. Thus, the high-pressure reciprocating pump delivery technique and mixing on the counterinjection principle in a mixing chamber, or the low-pressure gear-pump delivery technique and stirrer mixing can be used.

The high degree of non-inflammability may be further increased by the addition of flameproofing agents, but more especially by using inorganic-aqueous salt solutions or suspensions of, for example, alkali, ammonium or alkaline-earth phosphates, urea solutions, phosphoric acid etc. some of the above-mentioned compounds, especially the acid phosphates and phosphoric acid itself, additionally performing the function of a hardener for the alkali silicate solution which is normally used in excess.

Foams of this kind may be produced in the form of continuous or individual blocks, by the double conveyor-belt technique in the form of laminated or nonlaminated sheet products or even in situ by means of one of the above-mentioned mixing techniques or by essentially any mixing technique.

Particularly high-quality lightweight building materials for the structural branch of the building sector may be produced by filling packings of inorganic granulates of low gross density, such as for example expanded glass, expanded clay, expanded shale, pumice, etc., with the above-mentioned lightweight foams.

The inorganic properties are particularly important so far as non-inflammability is concerned, whereas the properties of the organic isocyanate-based foams are particularly important in regard to simple technology, favorable heat insulation and the possibility of directly foaming covering layers in a single production stage.

Wall and facing elements may be produced in this way and because of the small quantity of organic constituents in the composite material as a whole, satisfy the requirements of the fire class of non-inflammable building materials (A2) according to DIN 4102.

The reaction mixtures may also be dispersed in droplet form, for example, in petrol, or may be foamed and hardened in free fall or the like, resulting in the formation of foam beads.

It is also possible to incorporate in the foaming reaction mixtures, providing they are still fluid, organic and/or inorganic foamable or already foamed particles, for example, expanded clay, expanded glass, wood, popcorn, cork, hollow beads of plastics, for example vinyl chloride polymers, polyethylene, styrene polymers of foam particles thereof or even, for example, polysulphone, polyepoxide, polyurethane, ureaformaldehyde, phenol-formaldehyde and polyimide polymers, or to allow the reaction mixtures to foam through packings of these particles and, in this way, to produce insulating materials which are distinguished by their high degree of non-inflammability.

When the blowing agent capable of evaporating or forming gases at given temperatures, for example, a (halogenated) hydrocarbon, is simultaneously added at that temperature to a mixture of aqueous silicate solutions optionally containing inorganic and/or organic additives and hardeners, the initially liquid mixture formed in this way may be used not only for the production of homogeneous foams or other foams containing foamed or unfoamed fillers, but also for impregnating with foam nonwovens, woven fabrics, lattices, structural elements or other permeable structures of foamed material, so that it is possible in this way to obtain composite foams having special properties such as high non-inflammability, which may optionally be directly used as structural components in the building, furniture or vehicle and aircraft sector.

The foams according to the invention may be added to soil in particulate form, optionally enriched with fertilizers and plant-protection agents, in order to improve the agrarian consistency of soil. Foams of high water content may be used as substrates for propagating seedlings, cuttings and plants or cut flowers. By spraying the mixtures on to impassable or excessively loose ground, as encountered for example in sand dunes or marshes, it is possible to obtain a high degree of solidification which makes the ground passable after only a short time and affords protection against erosion. It is also of advantage to spray the reaction mixtures on to an object to be protected in the event of fire or accidents. The water present in the reaction mixture does not run down the surface of the object to be protected, nor does it evaporate prematurely, so that particularly effective protection against fire or heat and radiation is obtained, because the hardened mixture, providing it still contains water, cannot be heated significantly above 100° C. and absorbs IR or nuclear radiation.

By virtue of their sprayability, the mixtures can form effective protective walls and protective layers in mining in the event of accidents or even during routine work, for example by being sprayed on to woven fabrics, other surfaces, lattices or even merely onto walls. One factor of particular significance in this respect is that hardening is obtained after only a short time.

The foaming mixtures may also be used in building construction, construction engineering and road building, for the erection of walls, igloos, seals, for filling gaps, for plastering, priming, insulating, decorating and as coating, topping and covering materials. They may also be used as adhesives or mortars, or as casting compositions, optionally in filled form, for which purpose inorganic or organic fillers may be used.

Since the hardened foams obtained by the process according to the invention can show considerable porosity after drying, they are suitable for use as drying agents because they are able to absorb water. However, they may also be charged with active substances or used as catalyst supports or as filters and absorbents.

Additives optionally used or subsequently incorporated in the reaction mixture, such as emulsifiers, detergent ingredients, disperseants, wetting agents, perfumes, hydrophobizing substances, enable the property spectrum of the foams in wet or dry form to be modified as required.

On the other hand, the foams may be subsequently lacquered, metallized, coated, laminated, electroplated, vapor-coated, bonded or flocked in wet or dry or impregnated form. The moldings may be further processed in wet or dry form, for example by sawing, milling, drilling, planing, polishing and the like.

The properties of the optionally filled moldings may be further modified by thermal aftertreatment, oxidation processes, hot-pressing, sintering processes or surface melting or other compacting processes.

Suitable mold materials include inorganic and/or organic foamed or unfoamed materials, such as metals, for example iron, nickel or fine steel, lacquered or, for example teflon-coated aluminum, porcelain, glass, gypsum, cement, wood, plastics such as PVC, polyethylene, epoxide resins, polyurethanes, ABS, polycarbonate, etc. The foams obtainable in accordance with the invention may be surface-dried or, in the case of substantially permeable structures, for example relatively high-grade open-cell foams or porous materials, may even be dried by centrifuging, vacuum treatment, by blowing through air or by rinsing with (optionally heated) liquids or gases which remove the water present, such as methanol, ethanol, acetone, dioxan, benzene, chloroform, and the like or air, $CO_2$, superheated steam. The wet or dry moldings may also be similarly aftertreated by rinsing or impregnation with aqueous or non-aqueous acid, neutral or basic liquids or gases, for example, hydrochloric acid, phosphoric acid, formic acid, acetic acid, ammonia, amines, organic or inorganic salt solutions, lacquer solutions, solutions of polymerizable or already polymerized monomers, dye solutions, electroplating baths, solutions or catalysts or catalyst precursors and odorants.

The new composite plastics are suitable for use as structural materials, because they are resistant to tensile and compressive stressing and are tough, stiff and, at the same time, elastic and show high permanent dimensional stability under heat, coupled with a high degree of non-inflammability. In addition, foams of this kind also show outstanding heat-insulating and sound-absorbing properties, which, in conjunction with their outstanding resistance to fire and heat, opens up potential applications in the insulation sector.

For example, it is possible to produce high-quality lightweight structural panels either by cutting or sawing continuously foamed blocks into corresponding panels or by foaming panels and complicated moldings in molds, optionally under pressure. Moldings with an impervious outer skin can also be produced by suitable processes.

In particular, however, the process according to the invention is also suitable for in situ foaming. Thus, any hollow mold, of the type formed by the conventional method of formwork, may be cast or filled with foam.

Cavities, joints or cracks may readily be filled with the reaction mixture, resulting in a very firm bond between the joined materials. Insulating internal plasters may also be produced simply by spraying on the reaction mixture.

In many cases, the materials obtained may be used instead of wood or hardboard. They can be sawn, rubbed, planed, nailed, drilled or milled and may thus be machined and used in numerous different ways.

Highly brittle lightweight foams which may be obtained for example, with extremely high silicate contents or by combination with equally brittle organo polymers, may readily be converted by crushing in suitable machines into dust-fine powders which may be used for numerous purposes as organomodified silica fillers. This organo modification provides for favorable surface interaction with polymers and, in some cases, also for a certain degree of surface thermoplasticity which enables high-quality molding compounds to be produced, the additon of crosslinkers enabling topochemical surface reactions to be carried out.

For numerous applications, additional fillers in the form of inert particulate or powder-form materials are additionally incorporated in the mixtures of polyisocyanates and alkali silicates.

Suitable fillers include solid inert inorganic or organic substances which may be used, for example, in the form of powders, granulates, wires, fibers, dumb-bells, crystallites, spirals, rodlets, beads, hollow beads, foam particles, nonwovens, woven fabrics, knitted fabrics, ribbons, film fragments, and include, for example, dolomite, chalk, alumina, asbestos, basically adjusted silicas, sand, talcum, iron oxide, aluminum oxide, and oxide hydrates, alkali silicates, zeolites, mixed silicates, calcium silicates, calcium sulphates, alumo silicates, basalt wool or powder, glass fibers, carbon fibers, graphite carbon black, Al-, Fe-, Cu-, Ag-powder, molybdenum sulphide, steel wool, bronze or copper gauze, silicon powder, expanded clay particles, hollow glass beads, glass powder, lava and pumice particles, sawdust, wood chips, cork, cotton, straw, popcorn, coke, particles of filled or unfilled, foamed or unfoamed, stretched or unstretched organic polymers. Of the large number of organic polymers which may be used, a few are mentioned by way of example in the following and may be used, for example, in the form of powders, granulates, foam particles, beads, hollow beads, foamable or unfoamed particles, fibers, ribbons, woven fabrics, nonwovens, etc: polystyrene, polyethylene, polypropylene, polyacrylonitrile, polybutadiene, polyisoprene, polytetrafluoroethylene, aliphatic and aromatic polyesters, melamine-urea or phenolic resins, polyacetal resins, polyepoxides, polyhydantoins, polyureas, polyethers, polyurethanes, polyimides, polyamides, polysulphones, polycarbonates and, of course, any other copolymers.

Particularly preferred fillers are chalk, talcum, dolomite, clay, quartz powder, highly disperse silica, glass, carbon and standard plastics and rubber waste.

Generally, the composite materials according to the invention may be filled with considerable quantities of inert fillers without losing any of their excellent properties, predominantly inorganic composite materials preferably being filled with inorganic fillers in order to obtain a reinforcing effect, while predominantly silicate-based composite materials are preferably filled with organic fillers.

Products of low silicate content are particularly suitable for the production of quick-hardening high-quality surface coatings which show outstanding adhesion and resistance to wear, and for the production of elastomers of high strength and high modulus.

In many cases, the incorporation of an additional hardener for the alkali silicate solutions is unnecessary for the production of surface coatings, bonds, cements, or intermediate layers, especially on porous materials, because the carbon dioxide present in the air is sufficient as hardener. Polyisocyanates of low isocyanate content, for example less than 5%, are preferably used for applications such as these.

In this way, mixtures having a long pot life are obtained and may even be applied in thin layers, gradually hardening with time.

If only a little hardener ($CO_2$) is liberated during mixing of the polyisocyanate and the silicate solutions, a paste-like or dough-like plastic and formable material is obtained by partial hardening, accompanied by an increase in viscosity, and may be processed in molds and hardened at a later stage, for example by drying air or by heating.

Single-stage or multistage hardening is of particular interest for processing into cement, trowelling compounds, gapfilling compounds, mortars and the like. In the first stage of hardening for example, there is a rapid evolution of $CO_2$ (through the reaction of NCO groups with water) which converts the inorganic-organic composite material into a plastic or thermoplastic processible form, hardening being completed in a second, slower hardening stage, for example by the hydrolysis of a high molecular weight or low molecular weight ester.

The thermoplastic intermediate stage may also be processed by injection molding, extrusion or kneading.

In many cases, these intermediate stages may also be mixed with water, organic solvents, plasticizers, diluents, fillers and, in this way, may be modified and applied in numerous different ways.

The materials according to the invention are also suitable for finishing fibers in the impregnating agent, for which purpose it is possible both to use mixtures of the organic and silicate component and also to apply a two-bath treatment. Accordingly, the component with the better adhesion is preferably first applied, i.e., the polyisocyanate component to organic material and the silicate component to inorganic material.

In addition, it is possible, for example, by extruding the mixtures from spinnerets or slots, to produce fibers and films which may be used, for example, for the production of synthetic non-inflammable paper or for the production of nonwovens.

EXAMPLES

Polyisocyanates used:

P1: Distillate of the phosgenation product of an anilineformaldehyde condensate consisting of 90% by weight of 4,4'-diphenyl methane diisocyanate, 8% by weight of 2,4'-diphenyl methane diisocyanate and 2% by weight of trinuclear polyphenylpolymethylene polyisocyanates, viscosity at 40° C.:7 cP, partial crystallization at room temperature, NCO-content: 33% by weight.

P2: Diisocyanatodiphenyl methane is distilled off from the crude phosgenation product of an aniline-formaldehyde condensate until the distillation residue has a viscosity of 50 cP at 25° C. (2-nuclear polyisocyanate: 68% by weight; 3-nuclear polyisocyanate content: 16% by weight; content of more highly nuclear polyisocyanates: 16% by weight, NCO-content: 32% by weight).

P3: Similarly produced polyisocyanate having a viscosity of 100 cP at 25° C. (2-nuclear polyisocyanate content: 59.7% by weight; 3-nuclear polyisocyanate content: 21.3% by weight; content of more highly nuclear polyisocyanates: 19.0% by weight; NCO-content: 31.4% by weight).

P4: Similarly produced polyisocyanate having a viscosity of 200 cP at 25° C. (2-nuclear polyisocyanate content: 44.3% by weight; 3-nuclear polyisocyanate content: 23.5% by weight; content of more highly nuclear polyisocyanates: 32.2% by weight; NCO-content: 31.4% by weight).

P5: Similarly produced polyisocyanates having a viscosity of 400 cP at 25° C. (2-nuclear polyisocyanate content: 45.1% by weight; 3-nuclear polyisocyanate content: 22.3% by weight; content of more highly nuclear polyisocyanates: 32.6% by weight; NCO-content: 31.0% by weight).

P6: Similarly produced polyisocyanates having a viscosity of 800 cP at 25° C. (2-nuclear polyisocyanate content: 40.6% by weight; 3-nuclear polyisocyanate content: 27.2% by weight; content of more highly nuclear polyisocyanates: 32.2% by weight; NCO-content: 30.5% by weight).

P7: Polyisocyanate P6 and polyisocyanate P8 were mixed with one another in such a way as to form a polyisocyanate having a viscosity of 1100 cP at 25° C.

P8: Similarly produced polyisocyanate having a viscosity of 1700 cP at 25° C. (2-nuclear polyisocyanate content: 40.3% by weight; 3-nuclear polyisocyanate content: 34.0% by weight; content of more highly nuclear polyisocyanates: 25.7% by weight; NCO-content: 30.4% by weight).

P9: Semi-prepolymer obtained from 1000 parts by weight of polyisocyanate P5 and 15 parts by weight of 1,4-butane diol. Viscosity at 25° C.: 940 cP, NCO-content, 28.2% by weight.

P10: Semi-prepolymer obtained from 1000 parts by weight of polyisocyanate P5 and 30 parts by weight of 1,6-hexane diol; viscosity at 25° C.; 30,000 cP; NCO-content: 27% by weight.

P11: Semi-prepolymer obtained from 1000 parts by weight of polyisocyanate P5 and 15 parts by weight of 1,6-hexane diol viscosity at 25° C.: 1400 cP; NCO-content: 28.6% by weight.

P12: Semi-prepolymer obtained from 1000 parts by weight of polyisocyanate P5 and 30 parts by weight of glycerol; viscosity at 25° C.: 7500 cP; NCO-content: 26.2% by weight.

P13: Reaction product of 100 parts by weight of P3 with 1 part by weight of water; viscosity at 25° C.: 19,900 cP, NCO-content: 26.7% by weight.

P14: Polyisocyanate P3 was heated for 2 hours to 220° C. A polyisocyanate having a viscosity of 1450 cP at 25° C. and an NCO-content of 24.2% by weight was obtained.

P15: An isomer mixture of 80% by weight of 2,4-tolylene diisocyanate and 20% by weight of 2,6-tolylene diisocyanate was reacted with water under biuretizing conditions. Viscosity 25° C.: 6500 cP; NCO-content: 32.5% by weight.

P16: Solid commercial-grade distillation residue of the type obtained in the distillation of commercial-grade tolylene diisocyanate mixtures. NCO-content: 17% by weight; monomer content: approximately 10% by weight. Distillation residues of this kind may be obtained for example by the process described in U.S. Pat. No. 3,897,314.

P17: Liquid commercial-grade distillation residue of the type obtained in the distillation of 1,6-hexamethylene diisocyanate. Viscosity at 25° C.: 95 cP; NCO-content: 35% by weight.

P18: 2250 parts by weight of P17 and 250 parts by weight of finely ground P16 are heated together while stirring for 5 hours to 120° C., P16 dissolving in P17. The resulting polyisocyanate P18 had a viscosity of 800 cP at 25° C. and an NCO-content of 31.9% by weight.

P19: Polyisocyanate produced in the same way as P18 from 2000 parts by weight of P17 and 500 parts by weight of P16. Viscosity: 1800 cP at 25° C., NCO-content: 30.6% by weight.

P20: Polyisocyanate obtained in the same way as P18 from 1750 parts by weight of P17 and 750 parts by weight of P16. Viscosity: 6200 cP at 25° C., NCO-content: 29.2% by weight.

EXAMPLES 1 to 14

In a constant recipe, which corresponded in the composition of the main components and the activator used to Example 1 of U.S. Pat. No. 3,607,794, polyisocyanates of different viscosity and functionality were used and processed under the same conditions.

The basic recipe consisted of:

250 parts by weight of soda waterglass (48% solids, molar ratio $Na_2O:SiO_2 = 1:2$)
1.5 parts by weight of stabilizer (polyether polysiloxane, OS 710, a product of Bayer AG prepared according to U.S. Pat. No. 3,714,080)
4 parts by weight of amine catalyst (consisting of 75% by weight of N,N-dimethyl amino ethanol and 25% by weight of diazabicyclooctane)
} Component I 100 parts by weight of polyisocyanate
25 parts by weight of trichlorofluoromethane
} Component II Components I and II were separately mixed, combined, intensively stirred for 15 seconds with a high-speed stirrer and then poured into a paper packet where the reaction mixture began to foam shortly afterwards and hardened with a heat effect to form an inorganic-organic foam. The reaction times and the physical properties of the resulting foams are summarized in the following Table (Examples 1 to 4 are Comparison Examples).

The abbreviations used in the following Table have the following meanings:

$t_R$ = stoving time,
 mixing time of the mixture of component I and component II $t_L$ = latent time,
 period of time elapsing from the beginning of mixing to the beginning of foaming $t_A$ = setting time,
 period of time elapsing from the beginning of mixing to the beginning of hardening $t_S$ = rise time,
 period of time elapsing from the beginning of mixing to the end of foaming.

In each case, density and compressive strength were measured one day after production.

TABLE 1

| Example No. | Polyisocyanate | Reaction Times in Seconds | | | | Density (kg/m³) | Compresive Strength (kp/cm²) | General Assessment of the Resulting Foam |
|---|---|---|---|---|---|---|---|---|
| | | $t_R$ | $t_L$ | $t_A$ | $t_S$ | | | |
| 1 | P1 | 15 | 25 | — | — | — | — | foam mixture collapses after 40 secs. |
| 2 | P2 | 15 | 20 | — | — | — | — | foam mixture collapses after 40 secs. |
| 3 | P3 | 15 | 20 | — | — | — | — | foam mixture collapses after 45 secs. |
| 4 | P4 | 15 | 20 | — | — | — | — | foam mixture collapses partly after 50 secs. |
| 5 | P5 | 15 | 20 | 45 | 70 | 77 | 0.50 | tough-brittle, coarse-poured, irregular |
| 6 | P6 | 15 | 20 | 40 | 85 | 75 | 0.90 | tough-soft, medium-coarse poured, slightly irregular |
| 7 | P7 | 15 | 20 | 45 | 60 | 63 | 1.00 | tough-soft, medium-poured, regular |
| 8 | P8 | 15 | 20 | 40 | 54 | 69 | 1.00 | tough-soft, fine-poured, regular |
| 9 | P9 | 15 | 20 | 45 | 75 | 63 | 0.88 | tough, fine-poured, regular |
| 10 | P10 | 15 | 20 | 40 | 60 | 66 | 0.74 | tough-brittle, medium-poured, slightly irregular |
| 11 | P11 | 15 | 30 | 70 | 100 | 77 | 0.66 | tough-brittle, coarse-poured, slightly irregular |
| 12 | P12 | 15 | 25 | 45 | 60 | 93 | 2.30 | tough, fine-poured, regular |
| 13 | P13 | 15 | 30 | 45 | 60 | 94 | 1.6 | tough, fine-poured, regular |
| 14 | P14 | 15 | 30 | 50 | 60 | 66 | 1.5 | tough-brittle, fine-poured, regular |

As can be seen from Examples 1 to 4 of the Table, the foam mixture collapses when the viscosity of the polyphenylpolymethylene polyisocyanates used amounts to less than 400 cP at 25° C. (P1–P4). The more highly viscous polyphenyl-polymethylene polyisocyanates P5–P8 give inorganic-organic foams which, for substantially the same density, show higher compressive strengths and a more regular cell structure with finer pores, the more highly viscous and the more highly functional the polyisocyanate used.

The advantage of using relatively highly viscous polyisocyanates (P6–P8) is clearly reflected in the fact that, for substantially the same chemical structure as the lower viscosity P5, these polyisocyanates give foams which have significantly higher compressive strengths despite their lower density.

Reaction products of P5 with small quantities of low molecular weight diols (P9–P11) whose viscosity is greatly increased in relation to P5, but whose functionality would only appear to be negligibly higher, give foams with improved properties, Examples 9 to 11.

The properties of the foam are significantly improved when the polyisocyanate used is a semi-prepolymer (for example P12) in which both functionality and viscosity were increased, as in the case in Example 12.

Examples 13 and 14 show that a generally unsuitable, low-viscosity polyisocyanate (P3) can be converted simply by heating (P14) or by reaction with small quantities of water (P13) into a relatively high viscosity polyisocyanate from which useful inorganic-organic foams can be produced on the basis of the same recipe.

EXAMPLES 15 to 23 (Table 2)

200 parts by weight of soda waterglass (44% solids, molar ratio $Na_2O:SiO_2$ = 1:2)
1.5 parts by weight of stabilizer according to Examples 1 to 14
2 parts by weight of amine catalyst according to Examples 1 to 14
} Component I 100 parts by weight of polyisocyanate (P1-P8, P14)
5 parts by weight of diphenyl cresyl phosphate
40 parts by weight of trichlorofluoromethane
} Component II The components were mixed and the foams produced in accordance with Examples 1 to 14. The results are set out in Table 2, in which the abbreviations used have the same meanings as in Table 1. These examples, too, clearly show that polyisocyanates having a viscosity of more than 400 cP at 25° C. are superior to corresponding low-viscosity types. For substantially the same density, the resulting inorganic-organic foams obtained show greater toughness, a more regular and finer cell structure and higher compressive strengths with increasing viscosity of the starting polyisocyanates. (Examples 15 to 18 represent Comparison Examples).

substantially the density, greatly improved compressive strengths are obtained with increasing viscosity of the polyisocyanates. Comparison of Example 19 with Example 22 shows that compressive strength is actually doubled.

Example 23 shows that a low-viscosity, generally unsuitable polyisocyanate (P3) can be converted by simple heat treatment into a relatively high viscosity product suitable for use in accordance with the invention which may be processed into a useful foam.

EXAMPLE 24

200 parts by weight of soda waterglass according to Example 1
2 parts by weight of amine catalyst according to Ex. 1
} Component I 100 parts by weight of polyisocyanate P15
1 part by weight of stabilizer (polyether polysiloxane L 5340, a product of Union Carbide Corp.)
10 parts by weight of diphenyl cresyl phosphate
40 parts by weight of trichlorofluoromethane
} Component II The foam was produced in accordance with Examples 1 to 14.
$t_R$: 15 seconds
$t_L$: 30 seconds
$t_A$: 50 seconds
$t_S$: 60 seconds A fine-pored, brittle inorganic-organic foam plastic with a regular cell structure, which in its fresh state has a density of 33 kg/m³ is obtained.

EXAMPLE 25

400 parts by weight of soda waterglass according

TABLE 2

| Example No. | Polyisocyanate | Reaction Times In Seconds | | | | Density (kg/m³) | Compressive Strength (kp/cm²) | General Assessment of The Resulting Foam |
|---|---|---|---|---|---|---|---|---|
| | | $t_R$ | $t_L$ | $t_A$ | $t_S$ | | | |
| 15 | P1 | 15 | 35 | — | — | — | — | foam mixture collapses after 65 secs. |
| 16 | P2 | 15 | 50 | — | — | — | — | foam mixture collapes after 100 secs. |
| 17 | P3 | 15 | 45 | — | — | — | — | foam mixture collapses after 110 secs. |
| 18 | P4 | 15 | 45 | — | — | — | — | foam mixture collapses after 110 secs. |
| 19 | P5 | 15 | 50 | 120 | 160 | 29 | 0.27 | tough-brittle, coarse pored, irregular |
| 20 | P6 | 15 | 40 | 105 | 150 | 29 | 0.36 | tough, brittle-pored, slightly irregular |
| 21 | P7 | 15 | 45 | 105 | 145 | 30 | 0.34 | tough, medium-pored, regular |
| 22 | P8 | 15 | 40 | 90 | 130 | 28 | 0.54 | tough, fine-pored, regular |
| 23 | P14 | 15 | 65 | 115 | 130 | 35 | 0.60 | tough-brittle, medium-pored, regular |

Compared with the example summarized in Table 1, the foams summarized in Table 2 are distinguished in particular by their great toughness. As found in comparative investigations, this is attributable not only to the modified composition of the main components, but also to the diphenyl cresyl phosphate additionally used as flameproofing agent.

When polyisocyanates P1–P4, having a viscosity of less than 400 cP at 25° C., are used, the foam mixture collapses; although they have a functionality of greater than 2, these polyisocyanates are not suitable for the process according to the invention on account of their low viscosity.

Polyisocyanates P5–P8, which have a similar chemical structure and, in addition to a slightly higher functionality, are distinguished above all by a viscosity of ≧ 400 cP/25° C., are suitable for the production of inorganic-organic foams. As shown by Examples 19 to 22, foams with a more regular, finer cell structure, and for to Example 1
4 parts by weight of amine catalyst according to Example 1
} Component I 100 parts by weight of polyisocyanate P8
0.5 parts by weight of stabilizer according to Example 24
40 parts by weight of trichlorofluoromethane
} Component II The foam was produced in accordance with Examples 1 to 14.
$t_R$: 15 seconds
$t_L$: 45 seconds
$t_A$: 65 seconds
$t_S$: 115 seconds A hard, inorganic-organic foam plastic of medium pore size and regular cell structure with a density of 81 kg/m³ and a compressive strength of 0.6 kp/cm² is obtained. By virtue of its high inorganic component content, this foam shows a high degree of non-inflammability and easily satisfies the requirements of fire class B 1 (substantially non-inflammable) according to DIN 4102.

EXAMPLE 26

| | |
|---|---|
| 100 parts by weight of soda waterglass according to Example 1 | Component I |
| 2 parts by weight of amine catalyst according to Example 1 | |
| 300 parts by weight of polyisocyanate P8 | Component II |
| 1 part by weight of stabilizer according to Example 24 | |
| 20 parts by weight of trichlorofluoromethane | |

The foam was produced in accordance with Examples 1 to 14.

$t_R$: 15
$t_L$: 60
$t_A$: 90
$t_S$ 95

A fine-pored inorganic-organic foam plastic with a regular cell structure is obtained. Immediately after production, it has a density of 12 kg/m$^3$ and a compressive strength of 0.2 kp/cm$^2$. By virtue of its low gross density, this foam is particularly suitable for use as an inexpensive insulating foam.

EXAMPLE 27

200 parts by weight of soda waterglass according to Example 1

2 parts by weight of amine catalyst according to Example 1
} Component I 100 parts by weight of polyisocyanate P8
0.5 parts by weight of stabilizer according to Example 24
5 parts by weight of diphenyl cresyl phosphate
3 parts by weight of a chlorinated paraffin mixture, Witachlor 63, a product of Dynamit Nobel AG
} Component II 40 parts by weight of trichlorofluoromethane
100 parts by weight of a 40% aqueous dipotassium hydrogen phosphate solution
} Component III The components were first separately premixed, after which components I and III were successively introduced into Component II intensively stirred by means of a high-speed stirrer. After stirring for 15 secnds, the reaction mixture was poured into a paper packet in which it began to foam after 15 seconds (from the moment the components were combined) and after 135 seconds (from the moment the components were combined) hardened into a solid, inorganic-organic foam having a regular cell structure and fine pore size. Density and compressive strength were measured one day after production.

Density: 37 kg/m$^3$
Compressive strength: 0.3 kp/cm$^2$

The foam obtained is particularly suitable for insulating applications where a high degree of non-inflammability is simultaneously required. Panels produced from the recipe indicated easily pass the fire-duct test according to DIN 4102 and thus qualify as "substantially non-inflammable" (B1).

EXAMPLES 28 to 41    Table 3

The composition, reaction times, density and compressive strengths of the inorganic-organic foams obtained are shown in Table 3. The foams were produced in accordance with Examples 1 to 14, the abbreviations used having the same meanings as in Table 1. All the quantities of substances used are given in grams. Hard inorganic-organic foams having a regular cell structure and a medium to coarse pore size are obtained with densities in the range from 120 to 250 kg/m$^3$. By virtue of their high compressive strengths and high noninflammability, these foams are particularly suitable for the production of lightweight, self-supporting prefabricated structural components having an excellent heat-insulating effect.

TABLE 3

| | COMPONENT II | | | | | COMPONENT I | | | | | | | |
|---|---|---|---|---|---|---|---|---|---|---|---|---|---|
| | Polyisocyanate | | | | Trichloro-Fluoro-methane | Soda Water-Glass According to Exs. 1-14 | Emulsifier[1] | Triethyl-Amine | Reaction Times [2] | | | Density kg/m$^3$ [3] | Compressive Strength kp/cm$^2$ [3] |
| Example | P5 | P18 | P19 | P20 | | | | | $t_R$ | $t_L$ | $t_A$ | | |
| 28 | 50 | 100 | — | — | 20 | 150 | 0.2 | 2.0 | 20 | 37 | 46 | 130 | 9.6 |
| 29 | 75 | 75 | — | — | 20 | 150 | 0.2 | 1.5 | 20 | 32 | 48 | 123 | 6.8 |
| 30 | 100 | 50 | — | — | 20 | 150 | 0.2 | 1.5 | 20 | 34 | 54 | 125 | 7.5 |
| 31 | — | — | — | 150 | 20 | 150 | 0.2 | 2.0 | 20 | 36 | 48 | 194 | 26.3 |
| 32 | — | 50 | — | 100 | 30 | 150 | 0.2 | 2.0 | 20 | 38 | 65 | 123 | 6.6 |
| 33 | — | 75 | — | 75 | 30 | 150 | 0.2 | 2.0 | 20 | 50 | 80 | 173 | 21.3 |
| 34 | 20 | 130 | — | — | 20 | 150 | 0.2 | 5.0 | 30 | 42 | 55 | 246 | 38.2 |
| 35 | 20 | 130 | — | — | 25 | 150 | 0.2 | 5.0 | 30 | 46 | 60 | 213 | 26.0 |
| 36 | — | — | 150 | — | 30 | 150 | 0.2 | 5.0 | 20 | 38 | 55 | 193 | 14.5 |
| 37 | — | — | 150 | — | 30 | 150 | 0.3 | 5.0 | 25 | 40 | 58 | 187 | 17.7 |
| 38 | — | — | 150 | — | 30 | 150 | 0.4 | 5.0 | 25 | 38 | 57 | 190 | 18.9 |
| 39 | — | — | 150 | 25 | 150 | 150 | 0.2 | 3.0 | 20 | 30 | 40 | 161 | 16.2 |
| 40 | — | — | — | 200 | 25 | 150 | 0.2 | 3.0 | 20 | 28 | 40 | 154 | 14.5 |
| 41 | — | — | — | 100 | 30 | 200 | — | 2.0 | 20 | 43 | 75 | 170 | 6.3 |

[1] emulsifier, a 50% aqueous solution of the sodium salt of a sulphochlorinated paraffin mixture $C_{10}$–$C_{14}$ (Mersolat K30)
[2] $t_A = t_S$
[3] unit weight and compressive strength were measured one day after production of the foams

EXAMPLE 42

100 g of polyisocyanate P20 and 200 g of soda waterglass according to Example 1 were mixed for 1 minute with 400 g of glass microbeads (apparent density 1.6 kg/l, manufacturer: Ballotini) using a high-speed stirrer. The pourable liquid mass was poured into a metal mold measuring 4 cm × 4 cm × 16 cm. A few minutes later, the liquid mass began to harden with a heat effect, the test specimens being ready for mold release after only 2 hours. After tempering for 3 hours at 100° C., the molding had hardened into a rock-hard, substantially non-inflammable, concrete-like composite material having a gross density of 1620 kg/m$^3$ and a compressive strength of 278 kp/cm$^2$.

EXAMPLE 43

100 g of polyisocyanate P20, 200 g of soda waterglass according to Example 1 and 80 g of sawdust were intensively mixed with one another and the spreadable mass introduced into a metal mold (4 cm × 4 cm × 16 cm). After 1 hour, the mixture had largely solidified. By the following day, it had hardened into a rock-hard inorganic-organic composite material having a gross density of 1300 kg/m$^3$ and a compressive strength of 332 kp/cm$^2$. The material obtained is distinguished by a very high level of non-inflammability and may be worked in the same way as wood.

EXAMPLE 44

100 g of polyisocyanate P20, 300 g of soda waterglass and 600 g of building sand (washed Rhine sand, 0–3 mm) were stirred together for 1 minute and the resulting mixture introduced into a metal mold (4 cm × 4 cm × 16 cm). 10 minutes later, the mixture began to harden slowly with a slight heat effect and, after standing for 1 hour, was subsequently hardened for 3 hours at 100° C. The resulting inorganic-organic concrete-like composite material has a density of 1680 kg/cm$^3$ and a compressive strength of 110 kp/cm$^2$ and a flexural strength of 38.8 kp/cm$^2$.

EXAMPLE 45

100 g of polyisocyanate P20 and 400 g of soda waterglass according to Example 1 were first separately mixed, followed by the addition of 100 g of vermiculite (apparent density 150 kg/m$^3$). The mixture was thoroughly stirred, and while still fluid, was introduced into a metal mold (4 cm × 4 cm × 16 cm) in which it began to solidify 40 minutes later. After storage for 24 hours at room temperature, the test specimen was hardened for 2 hours at 100° C. A non-inflammable, wood-like solid inorganic-organic insulating material having a density of 750 kg/m$^3$ and a compressive strength of 39 kp/cm$^2$ was obtained.

EXAMPLE 46

100 g of an, on average, trifunctional polyisocyanate based on 1,6-hexamethylene diisocyanate, biuretized by the addition of water, with an NCO-content of 22% by weight and a viscosity of 4000 cP at 25° C., were mixed with 300 g of soda waterglass according to Example 1, and 100 g of vermiculite according to Example 45 stirred into the resulting mixture.

A foundation material with a pot life of more than 5 hours is obtained. After 2 days, it hardens into a hard, wood like material having excellent fire-retarding properties.

What is claimed is:

1. A process for the production of hard inorganic-organic plastics consisting of a polymer-polysilica gel composite material in the form of a solid/solid xerosol, said process comprising reacting
   (A) an aqueous alkali metal silicate solution with
   (B) a polyisocyanate, said polyisocyanate being a liquid polyisocyanate, free from hydrophilic groups with a viscosity at 25° C. of at least about 500 cP and having an average functionality of greater than 2, and being selected from the group consisting of
     (i) phosgenation products of condensates of aniline or anilines alkylsubstituted on the nucleus, with aldehydes or ketones;
     (ii) solutions of distillation residues accumulating during the production of tolylene diisocyanate, diphenyl methane diisocyanate, or hexamethylene diisocyanate, in monomeric polyisocyanates or in organic solvents;
     (iii) mixtures of said distillation residues; and
     (iv) modified polyisocyanates containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides;
said reaction being conducted in the absence of inorganic water-binding fillers, and further being characterized in that the weight ratio of said polyisocyanate to said aqueous alkali metal silicate is from 90:10 to 10:90.

2. The process of claim 1, wherein a phosgenation product of aniline-formaldehyde condensates is used as the polyisocyanate.

3. The process of claim 1, wherein 20 to 54% aqueous silicate solutions are used, the ratio by weight of the polyisocyanate to the aqueous silicate solution being between 70:30 and 20:80.

4. The process of claim 3, wherein sodium silicate solutions with an Na$_2$O:SiO$_2$ molar ratio in the range from 1.6 to 3.3 are used as the silicate solution.

5. The process of claim 1, wherein a catalyst or accelerator is added to the reaction mixture.

6. The process of claim 5, wherein a tertiary amine is used as catalyst.

7. The process of claim 1, wherein the reaction is accompanied by foam formation.

8. The process of claim 7, wherein a blowing agent is added to the reaction mixture.

9. The process of claim 1, wherein an emulsifying agent is added to the reaction mixture.

10. The process of claim 1, wherein an organic polymeric substance is added to the reaction mixture.

11. The process of claim 1, wherein inert inorganic, organic particulate or fibrous materials are added to the reaction mixture.

12. Inorganic-organic plastics of high strength elasticity, dimensional stability under heat and substantial non-inflammability, consisting of a macroscopically homogeneous composite material, in the form of a solid/solid xerosol, of high molecular weight organic polyadduct and high molecular weight silicate, produced according to the process of claim 1.

13. The inorganic-organic foam plastics of claim 12 having densities of less than about 150 kg/m$^3$.

14. The inorganic-organic plastics of claim 13 having densities of from about 10 to about 80 kg/m$^3$.

15. The process of claim 1, wherein said polyisocyanate has a viscosity at 25° C. of from about 500 to about 10,000 cP.

16. The process of claim 15, wherein said polyisocyanate has a viscosity at 25° C. of from about 800 to about 6000 cP.

17. The process of claim 2, wherein said polyisocyanate has a viscosity at 25° C. of from 500 to 5000.

18. A process for the production of hard porous inorganic-organic plastics consisting of a polymer-polysilicate gel composite material in the form of a solid/solid xerosol, said process comprising reacting
   (A) an aqueous alkali metal silicate solution with (B) a polyisocyanate, said polyisocyanate being a liquid polyisocyanate, free from hydrophilic groups with a viscosity at 25° C. of at least about 400 cP and an average functionality of greater than 2, and being selected from the group consisting of
  (i) phosgenation products of condensates of aniline or anilines alkylsubstituted on the nucleus, with aldehydes or ketones;
  (ii) solutions of distillation residues accumulating during the production of tolylene diisocyanate, diphenyl methane diisocyanate, or hexamethylene diisocyanate, in monomeric polyisocyanates or in organic solvents;
  (iii) mixtures of said distillation residues; and
  (iv) modified polyisocyanates containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides; said reaction being conducted in the absence of inorganic water-binding fillers, and in the presence of polyether polysiloxane foam stabilizers, and further being characterized in that the weight ratio of polyisocyanate to said aqueous alkali metal silicate is from 90:10 to 10:90.

19. Inorganic-organic porous plastics of high strength, elasticity, dimensional stability under heat and substantial non-inflammability, consisting of a macroscopically homogeneous composite material in the form of a solid/solid xerosol of high molecular weight organic polyadduct and high molecular weight silicate, produced according to the process of claim 18.

* * * * *